W. J. AND K. S. McKELVY.
POWER ATTACHMENT FOR AUTOMOBILES.
APPLICATION FILED AUG. 9, 1919.

1,364,773.

Patented Jan. 4, 1921.
2 SHEETS—SHEET 1.

WITNESS:
L. B. James

W. J. McKelvy
K. S. McKelvy   INVENTORS
BY
Victor J. Evans
ATTORNEY.

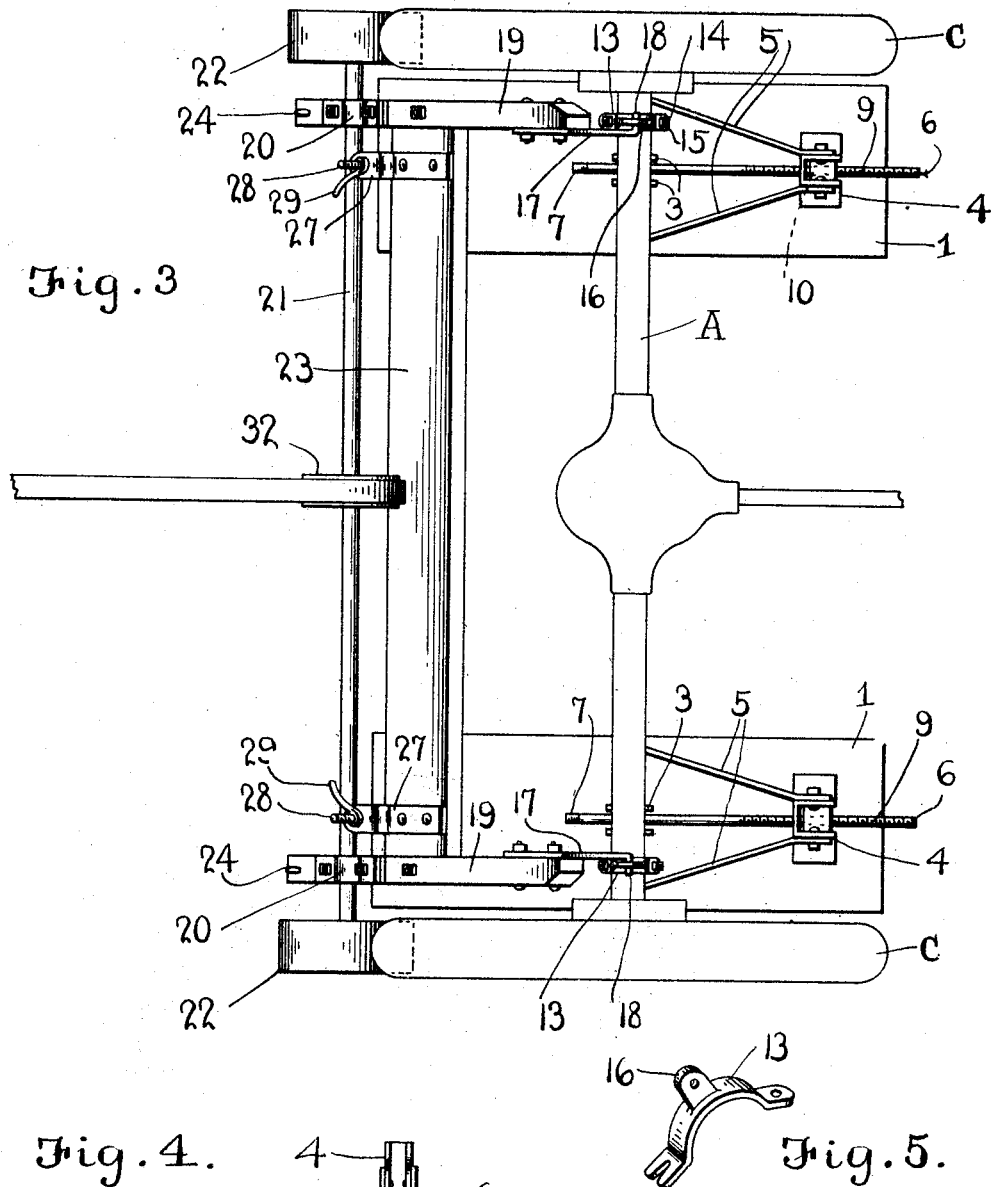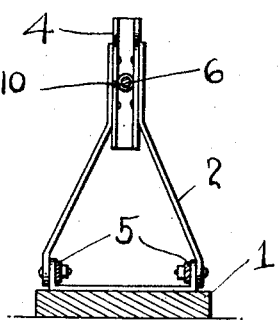

UNITED STATES PATENT OFFICE.

WILLIAM J. McKELVY AND KNOX S. McKELVY, OF HERTHERTON, MICHIGAN.

POWER ATTACHMENT FOR AUTOMOBILES.

1,364,773. Specification of Letters Patent. Patented Jan. 4, 1921.

Application filed August 9, 1919. Serial No. 316,508.

*To all whom it may concern:*

Be it known that we, WILLIAM J. MCKELVY and KNOX S. McKELVY, citizens of United States of America, residing at Hertherton, in the county of Montmorency and State of Michigan, have invented new and useful Improvements in Power Attachments for Automobiles, of which the following is a specification.

This invention relates to motor vehicles, particularly to attachments therefor, and has for its object the provision of a device adapted to be moved into engagement with the rear wheels of an automobile whereby power derived from the rotation of the automobile wheels may be conveyed to any desired place or imparted to any desired machinery for driving the same.

An important object is the provision of a device of this character which is attached to the rear axle of a motor vehicle and can be transported in this position, and which is swingable to be disposed in an idle position or in operative relation with pulleys carried by the device engaging against the automobile wheels, the device being readily detachable when desired.

Another object is the provision of a device of this character having associated therewith a supporting jack arrangement whereby the rear axle of an automobile may be elevated so that the rear wheels will be out of contact with the ground, and whereby the automobile may be pushed forward, thereby tightening the drive belt.

An additional object is the provision of a device of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings, in which—

Fig. 3 is a plan view of the rear axle showing the device associated therewith and in operative position, and Fig. 4 is a detail sectional view through one of the jack members, and Fig. 5 is a perspective view of one of the clamping elements engaging the axle housing.

The remaining figures are detail views.

Referring more particularly to the drawings, the letter A designates the rear axle housing of an automobile, which in the present instance is shown as being of a very popular make though it will be understood that the device to be hereinafter described may be associated with the rear axle of automobiles of various makes, it being necessary that slight modifications in the size and proportions of parts be resorted to in order to adapt the device for use upon axle housings of varying dimensions. The device may also be adapted for engagement with the springs of any auto, when preferred. Associated wtih the rear axle are the wheels B which are provided with the usual pneumatic or solid tires C.

Figure 1:
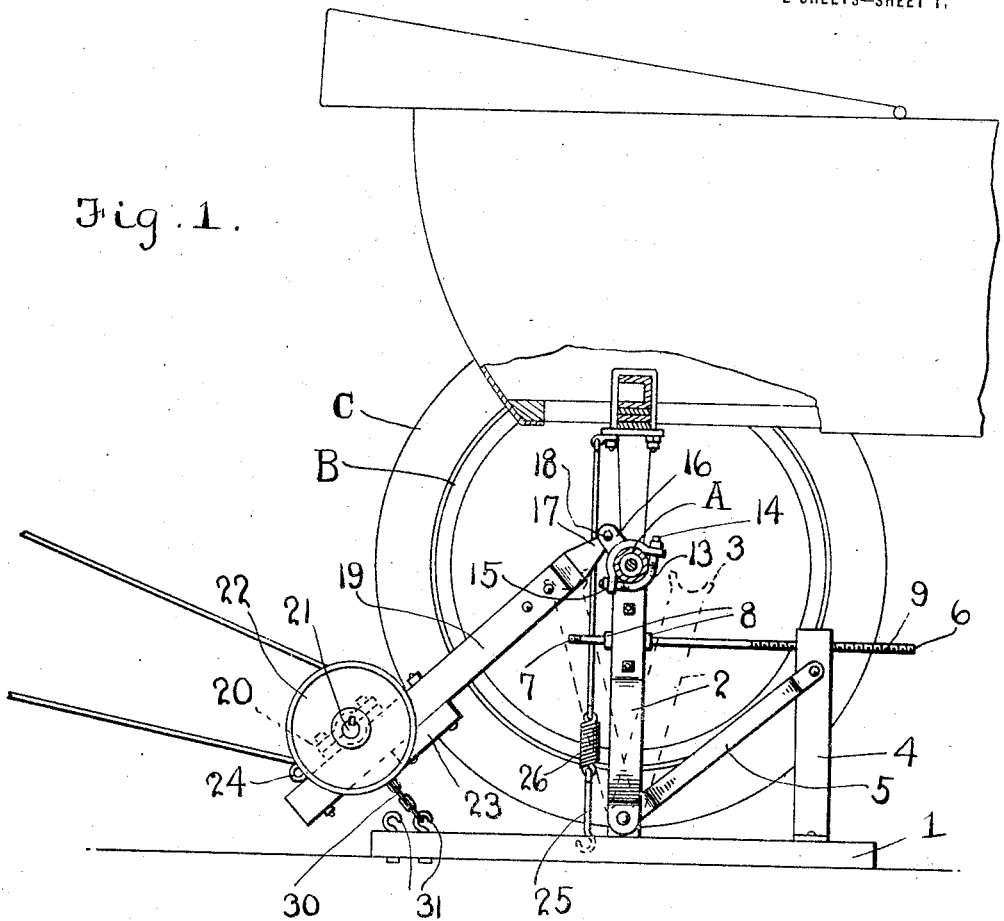
Figure 1 is a side elevation of the rear portion of an automobile showing our jack arrangement engaged beneath the rear axle and showing the power drive shaft with its pulleys engaging the rear wheels, parts of the automobile being in section.
Figure 2:
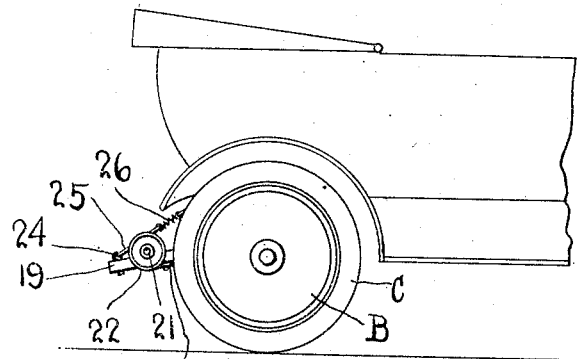
Fig. 2 is a similar view with the jack arrangement removed and the power transmitting shaft swung into idle position.

In carrying out our invention we make use of a supporting jack structure disposed adjacent each rear wheel. The jack structure at each wheel comprises a base 1 which may be a board or plank and pivoted upon the top of this plank or base adjacent the center thereof is a standard 2 which has its upper end provided with a saddle 3 adapted for engagement beneath the axle of the automobile. Secured rigidly upon the base adjacent one end thereof, is a post 4 which is strengthened by an inclined brace 5. Extending through the standard 2 is a rod 6 which has one end 7 adapted for engagement by a socket wrench or the like whereby the rod may be rotated and which has secured thereon at each side of the standard 2, a collar 8. The other end of the rod 6 is threaded, as shown, at 9, and engaged within a threaded opening 10 in the upper end of the post 4. When the jacks are in position with the automobile axle resting upon the saddle members 3, the automobile wheels B will be held elevated out of engagement with the ground or other surface traveled over. It will be seen that by engaging a wrench upon the squared end 7 of the rod 6 and rotating the rod 6 to the left, the standard 2 will swing rearwardly to a limited extent, as shown by dotted lines in Fig. 1 and when the rod 6 is moved to the right the standard 2 will move forwardly, as shown by dotted lines. The function of this arrangement will hereafter be made apparent.

Disposed on the axle housing A adjacent the ends thereof are clamping members 13 which are engaged by clamping bolts 14 engaging about the axle housing and having their ends passing through the clamping members 13 and provided with nuts 15. Formed on each clamping member 13 is an ear 16. The clamping members may be formed for engagement upon the springs when preferred.

Associated with each clamping member is a bracket 17 pivotally connected with the ear 16, as shown at 18, and carrying at its outer end the bar 19. Each bar 19 carries a bearing 20 and extending transversely across these bars and journaled in the bearings 20 is a shaft 21 carrying at its ends friction rollers 22 engaging against the tires C on the wheels. The bars 19 are connected by a transverse bar 23 whereby the bars 19 may be moved in unison.

Secured to an eye bolt 24 carried by each bar 19 is a link 25 to which is connected a coil spring 26 in turn connected with some convenient portion of the rear of the automobile. The function of the spring 26 is to give flexibility to the supporting rod or chain so as to absorb the shock when the device is elevated into inoperative position and the automobile is traveling.

In order that the device may be held in position with the rollers 22 engaging the tires, we provide upon the bar 23 brackets 27 through which extend eye bolts 28 provided above the brackets with handled adjusting nuts 29 and carrying at their lower ends chain sections 30 engaging upon hooks 31 carried by the rear ends of the planks or jack members 10.

In the operation of the device the jack members are first inserted in position to hold the rear wheels elevated. The operator then disengages the springs 26 and engages the chain section 30 upon the hook 31. The handled nuts 29 are then operated to draw the bars 19 and associated parts downwardly so that the friction rollers 22 will be urged firmly into engagement with the tires C. When the motor of the automobile, and consequently the rear wheels, are then rotated, it will be seen that the shaft 21 will also be rotated. This shaft may, if desired, be provided with a suitable crank portion or, as shown in the drawings, may carry a pulley 32 about which a belt may be engaged for conveying power from the rear wheels to any machinery to be driven, or the belt may be engaged upon either of the friction rollers 22 to convey the power to any machines to be driven. In order to tighten the belt, the operator may employ any suitable wrench to rotate the rod 6 for moving the pivoted standards forwardly so as to move the rear axle bodily. Loosening of the belt, when necessary, is accomplished by the reverse operation. When the use of the device is not desired, the nuts 29 are loosened and the chains 30 disconnected from the hooks 31 and the links 25 connected with the springs 26, whereupon the device will be ready for transportation to any other location where its use is desired.

From the foregoing description and a study of the drawings it will be apparent that we have thus provided an extremely efficient device which may be easily installed in position upon the rear axle housing of an automobile and which is so constructed as to derive power from the rear wheels so that this power may be freely transmitted to any machinery to be driven, and which can be moved about from one place of operation to another while thus installed in position on the rear axle of an automobile and which has associated therewith a supporting jack which will adjust the automobile forward or backward to give the proper tightness to the drive belt so it will properly engage the pulley of the machine to be driven.

While we have shown and described the preferred embodiment of our invention, it is of course to be understood that we reserve the right to make such changes in the form, construction and arrangement of parts as will not depart from the spirit of the invention or the scope of the subjoined claims.

Having thus described our invention, we claim:—

1. In combination with the rear axle housing and rear wheels of an automobile, means for supporting the wheels out of engagement with the ground, a pair of bars detachably and pivotally connected with the axle housing, a shaft journaled across said bars, a power transmitting pulley on said shaft, friction rollers on the ends of said shaft adapted to be moved into engagement with said wheels, and means for holding said friction rollers firmly in engagement with the wheels.

2. In combination with the rear axle housing and rear wheels of an automobile, means for holding the rear wheels out of engagement with the ground, a pair of clamping members detachably engaged upon the axle housing adjacent the ends thereof, a pair of bars pivotally connected with said clamping members, a cross bar connecting said pair of bars, a shaft journaled on said pair of bars, a drive pulley on said shaft, friction rollers carried by said shaft and engaging said wheels, spring tension normally drawing said bars upwardly with said rollers out of engagement with the wheels, means for holding said bar down with said rollers in engagement with the wheels, and means for adjusting the rear wheel supporting means.

3. In combination with the rear construction of an automobile, means for holding the rear wheels out of engagement with the ground, a pair of clamping members detachably engaged upon the rear portion of the automobile, a pair of bars pivotally connected with said clamping members, a cross bar connecting said pair of bars, a shaft journaled on said pair of bars, a drive pulley on said shaft, friction rollers carried by said shaft and engaging said wheels, spring means for holding said bars elevated with said rollers out of engagement with the wheels, means for holding said bars down with said rollers in engagement with the wheels, said last named means comprising a pair of brackets secured upon said cross bar, eye bolts threaded through said brackets and provided with adjusting nuts, and flexible members carried by said eye bolts and detachably engageable with said means for holding the wheels elevated.

4. A device of the character described adapted for association with the rear portion of an automobile and to remain thereupon while the automobile is traveling from place to place, comprising clamping members engageable upon suitable elements in the rear construction of the automobile, bars pivoted upon said clamping members, a shaft journaled through said bars, friction rollers on said shaft engageable with the wheels, and means for holding the rear axle of the automobile elevated, said means being adjustable whereby to shift the rear axle forwardly or backwardly.

5. A device of the character described adapted for association with the rear portion of an automobile and to remain thereupon while the automobile is traveling from place to place, comprising clamping members engageable upon suitable elements in the rear construction of the automobile, bars pivoted upon said clamping members, a shaft journaled through said bars, friction rollers on said shaft engageable with the wheels, means for holding the rear axle of the automobile elevated comprising a pair of jack structures each including a supporting base, a standard pivoted thereon and engageable beneath the axle, a rigid post on the base, and a rod rotatably and nonslidably engaging through said pivoted standard and threadedly engaging through said post.

In testimony whereof we affix our signatures.

WILLIAM J. McKELVY.
KNOX S. McKELVY.